(12) United States Patent
Hirao et al.

(10) Patent No.: US 11,207,712 B2
(45) Date of Patent: Dec. 28, 2021

(54) SONIC DEVICE

(71) Applicant: KABUSHIKI KAISHA TOSHIBA, Minato-ku (JP)

(72) Inventors: Akiko Hirao, Kawasaki (JP); Tomio Ono, Yokohama (JP); Yasuharu Hosono, Kawasaki (JP); Tsuyoshi Kobayashi, Kawasaki (JP); Mitsunaga Saito, Inzai (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 390 days.

(21) Appl. No.: 16/354,465

(22) Filed: Mar. 15, 2019

(65) Prior Publication Data

US 2020/0086347 A1    Mar. 19, 2020

(30) Foreign Application Priority Data

Sep. 19, 2018  (JP) .............................. JP2018-174920
Mar. 5, 2019   (JP) .............................. JP2019-039464

(51) Int. Cl.
  *G01N 29/28* (2006.01)
  *B06B 1/06* (2006.01)
  (Continued)

(52) U.S. Cl.
  CPC ............ B06B 1/0685 (2013.01); B06B 1/064 (2013.01); G01H 1/00 (2013.01); G01N 29/04 (2013.01);
  (Continued)

(58) Field of Classification Search
  CPC .... G01N 29/04; G01N 29/043; G01N 29/223; G01N 29/28; G01N 29/2437;
  (Continued)

(56) References Cited

U.S. PATENT DOCUMENTS

2018/0120196 A1* 5/2018 Georgeson ............... B64D 1/02
2018/0371199 A1  12/2018 Hayashi et al.
2021/0006181 A1* 1/2021 Koci ....................... H02N 13/00

FOREIGN PATENT DOCUMENTS

CA    2979925 A1 * 4/2018 ............. G01N 27/90
CA    3063386 A1 * 7/2020 ........... B64C 39/024
(Continued)

OTHER PUBLICATIONS

Nguyen, T.-A. N. (2018). Enhanced transceiver performance through self-interference cancellation in multiple modalities (dissertation). (Year: 2018).*

*Primary Examiner* — Alexander A Mercado
(74) *Attorney, Agent, or Firm* — Oblon, McClelland, Maier & Neustadt, L.L.P.

(57) ABSTRACT

A sonic device in an embodiment includes a sonic transducer unit and a sonic propagation unit. The sonic transducer unit performs at least one of transmitting and receiving a sonic wave, and has a sonic function surface to configure at least one of a wave transmitting surface and a wave receiving surface. The sonic propagation unit includes: a substrate having a pair of electrodes; an electroadhesive element expressing body including a resin crosslinked body arranged on the substrate, and particles dispersed in the resin crosslinked body; and a power supply to apply voltage to the pair of electrodes. The sonic propagation unit is provided on the sonic function surface of the sonic transducer unit, and the electroadhesive element expressing body in the sonic propagation unit comes into contact with a test object.

17 Claims, 7 Drawing Sheets

(51) Int. Cl.
  *G01N 29/24* (2006.01)
  *G10K 11/00* (2006.01)
  *G01H 1/00* (2006.01)
  *G01N 29/04* (2006.01)
  *G01N 29/22* (2006.01)

(52) U.S. Cl.
  CPC ....... *G01N 29/223* (2013.01); *G01N 29/2437* (2013.01); *G01N 29/28* (2013.01); *G10K 11/004* (2013.01)

(58) Field of Classification Search
  CPC ..... B06B 1/0685; B06B 1/064; B06B 1/0644; G01K 11/004; G01K 11/02; G01H 1/00
  See application file for complete search history.

(56) References Cited

FOREIGN PATENT DOCUMENTS

| | | |
|---|---|---|
| JP | 4504048 | 7/2010 |
| JP | 5338036 | 11/2013 |
| JP | 2017-019644 | 1/2017 |
| WO | WO 2017/130998 A1 | 8/2017 |

\* cited by examiner

// SONIC DEVICE

CROSS REFERENCE TO RELATED APPLICATION

This application is based upon and claims the benefit of priority from Japanese Patent Application No. 2019-039464, filed on Mar. 5, 2019, and Japanese Patent Application No. 2018-174920, filed on Sep. 19, 2018; the entire contents of which are incorporated herein by reference.

FIELD

Embodiments described herein relate generally to sonic devices such as an ultrasonic transducer and a sonic receiver.

BACKGROUND

A nondestructive testing (NDT) using propagation of a sonic wave such as an ultrasonic wave, an elastic wave or the like is applied for test of various components, apparatuses, infrastructures and so on. A typical sensor is an ultrasonic transducer. Ultrasonic transducers are a type of acoustic sensor divided into three: transmitters, receivers and transceivers. Further, an ultrasonic transducer is applied also for medical diagnosis and the like. In the case of installing a sonic device such as a sonic receiver, a sonic transmitter, and a sonic transmitter-receiver represented by a transducer, an ultrasonic probe, an AE (acoustic emission) sensor or the like for the evaluating a test object, a couplant is introduced on at least one of a wave transmitting surface and a wave receiving surface. The couplant is a material (usually liquid) that facilitates the transmission of ultrasonic energy from the transducer into the test specimen such as glycerin, Vaseline.

The above-described couplant is important in efficiently transmitting a sonic wave such as an ultrasonic wave from the sonic device to the test object or from the test object to the sonic device to enhance the test accuracy, but the process of applying and removing the couplant in the liquid form or viscous body form is troublesome. This is a factor to increase the time and number of processes for test. The test object may be contaminated with the couplant in some cases, in which case the testing itself cannot be carried out. In the case of the AE sensor, an adhesive or jig is applied for adhering it to the test object. In the case where the frequency of attachment and detachment is high as in the case of using it for testing for a short time, the jig is used. In this event, to ensure high detection sensitivity, the couplant such as glycerin or Vaseline needs to be applied between the wave-receiving surface of the AE sensor and the installation surface for the test object, and possibly contaminates the test object. Besides, in the case where an object to be inspected is made of concrete, the AE sensor needs to be bonded using an adhesive, and the detaching process after the test is troublesome and the AE sensor cannot be successfully detached in some cases.

A solid couplant is also suggested, but propagation of the sonic wave is largely inferior to the case of using the couplant in a liquid form. Because air greatly different in acoustic impedance intervenes between the installation surface for the test object of the ultrasonic device such as the sonic receiver or the sonic transmitter-receiver and the test object, to prevent the air from intervening between the installation surface of the sonic device and the test object, a solid couplant having pressure sensitive adhesion is also suggested. However, in this case, the installation surface of the sonic device comes into close contact with the test object, failing to slide the sonic device. Therefore, even in the case of moving the installation position by a small distance, it is necessary to peel once the sonic device together with the couplant from the test object.

DETAILED DESCRIPTION

A sonic device in an embodiment includes: a sonic transducer unit configured to perform at least one of transmitting and receiving a sonic wave, and having a sonic function surface to configure at least one of a wave transmitting surface and a wave receiving surface of the sonic wave; and a sonic propagation unit including: a substrate having a pair of electrodes; an electroadhesive element expressing body, configured to come into contact with a test object, including a resin crosslinked body arranged on the substrate, and particles dispersed in the resin crosslinked body; and a power supply configured to apply voltage to the pair of electrodes, the sonic propagation unit being provided on the sonic function surface of the sonic transducer unit.

Sonic devices in embodiments will be described hereinafter with reference to the drawings. Note that substantially the same components are denoted by the same reference signs, and description thereof may be partially omitted in some cases in the embodiments. The drawings are schematic, and the relation between thicknesses and plane dimensions of parts, ratios of the thicknesses of the parts and the like may differ from actual ones. The terms indicating upper and lower directions in the description may differ from actual directions based on the gravitational acceleration direction.

The sonic devices in the embodiments each have at least one of functions of transmitting and receiving a sonic wave, and examples thereof include an ultrasonic transducer and a sonic receiver. A representative example of the ultrasonic transducer can be an ultrasonic probe. A representative example of the sonic receiver can be an AE sensor. Further, the sonic device may be a sonic transmitter. The sonic wave described herein is a generic name of all elastic vibration waves propagated through an elastic body regardless of gas, liquid, solid, and includes not only a sonic wave within the audible frequency range but also an ultrasonic wave having a frequency higher than the audible frequency range and a low-frequency sound having a frequency lower than the audible frequency range and so on. The frequency of the sonic wave is not particularly limited but includes a high frequency to a low frequency. The sonic devices such as the ultrasonic transducer and the sonic receiver in the embodiments include a sonic transducer unit having at least one of functions of transmitting and receiving a sonic wave and a sonic propagation unit as will described below in detail. The sonic transducer unit has a transmitting-receiving surface, a receiving surface, or a transmitting surface for the sonic wave. Here, a surface configuring as at least one of the wave transmitting surface and the wave receiving surface for the sonic wave of the sonic transducer unit is described as a sonic function surface.

First Embodiment

Figure 1:
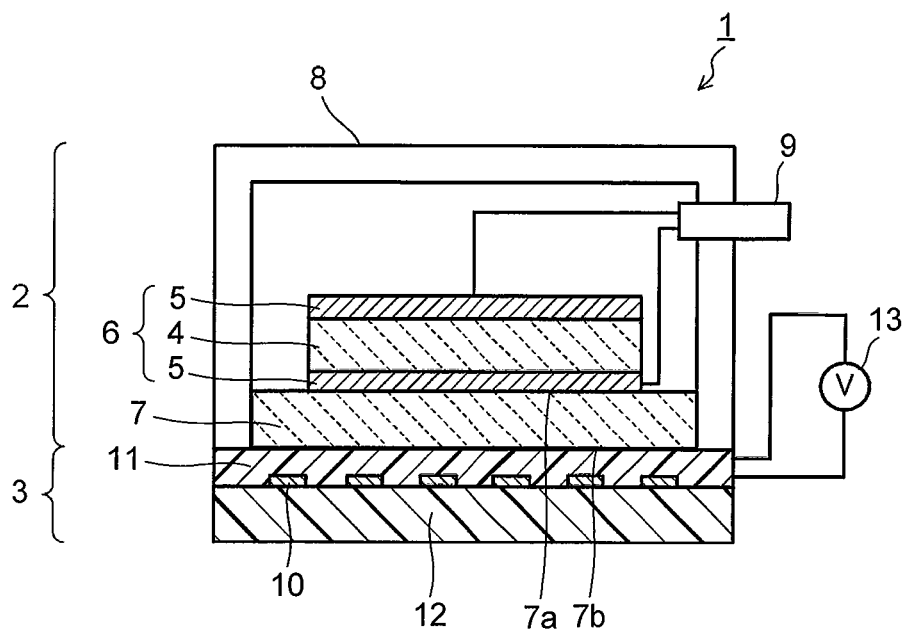
FIG. 1 is a cross-sectional view illustrating a sonic device in a first embodiment.

FIG. 1 is a perspective view illustrating a sonic device in a first embodiment. A sonic device 1 illustrated in FIG. 1 indicates a vertical type ultrasonic probe being one example of an ultrasonic transducer. The ultrasonic device 1 as the vertical type ultrasonic probe includes a sonic transducer unit (ultrasonic transducer) 2 having a transmitting function and a receiving function for an ultrasonic wave, and a sonic propagation unit 3 provided on a sonic function surface which functions as a wave transmitting surface and a wave receiving surface for the sonic wave of the sonic transducer unit 2. The component parts 2, 3 and so on will be described below in detail.

The sonic transducer unit 2 includes an ultrasonic transmitting-receiving element 6 having a vibrator (piezoelectric body) 4 for an ultrasonic probe and electrodes 5 provided on both upper and lower surfaces of the vibrator 4. The ultrasonic transmitting-receiving element 6 is arranged on a wave receiving plate 7 and housed, in this state, in a case 8. The electrodes 5 of the ultrasonic transmitting-receiving element 6 are electrically connected to a connector 9 provided at the case 8. To the vibrator 4 having the piezoelectric property, the ultrasonic transmitting-receiving element 6, the wave receiving plate 7 and so on, a constitutional material, a structure and so on used for a publicly-known ultrasonic probe are applicable, but not particularly limited. The electrodes 5 apply voltage to the vibrator 4, whereby the sonic transducer unit 2 emits an ultrasonic wave and receives reflected wave of the ultrasonic wave via the wave receiving plate 7. In the sonic transducer unit 2, a surface 7b opposite to a surface 7a in contact with the ultrasonic transmitting-receiving element 6 of the wave receiving plate 7 becomes a wave transmitting surface and a wave receiving surface (wave transmitting-receiving surfaces) for the ultrasonic wave.

Figure 2:
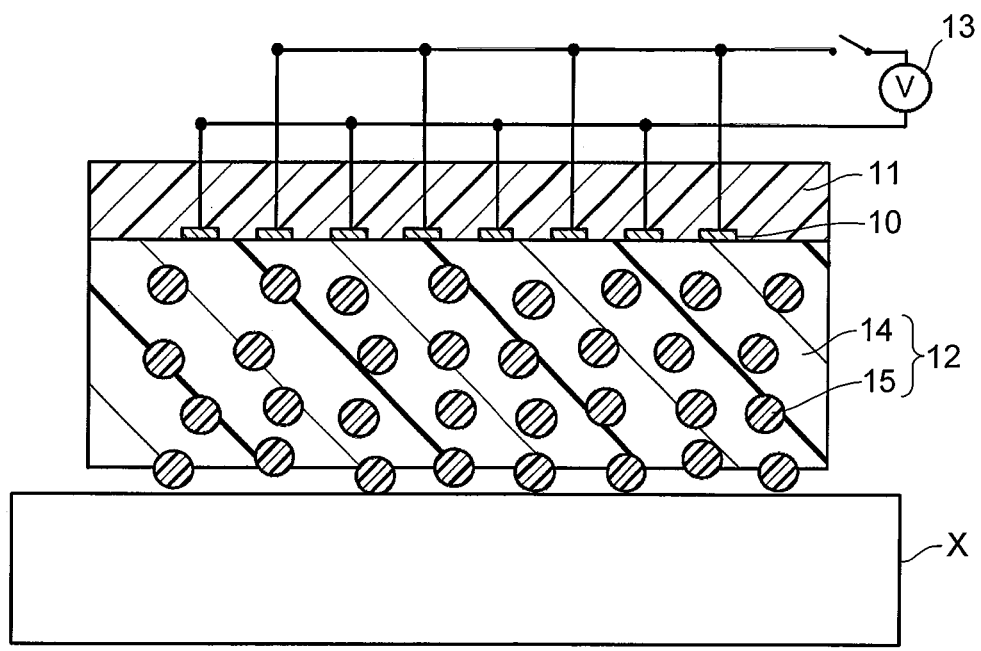
FIG. 2 is a cross-sectional view illustrating a state where no voltage is applied to an electroadhesive element expressing body in the sonic device illustrated in FIG. 1.
Figure 3:
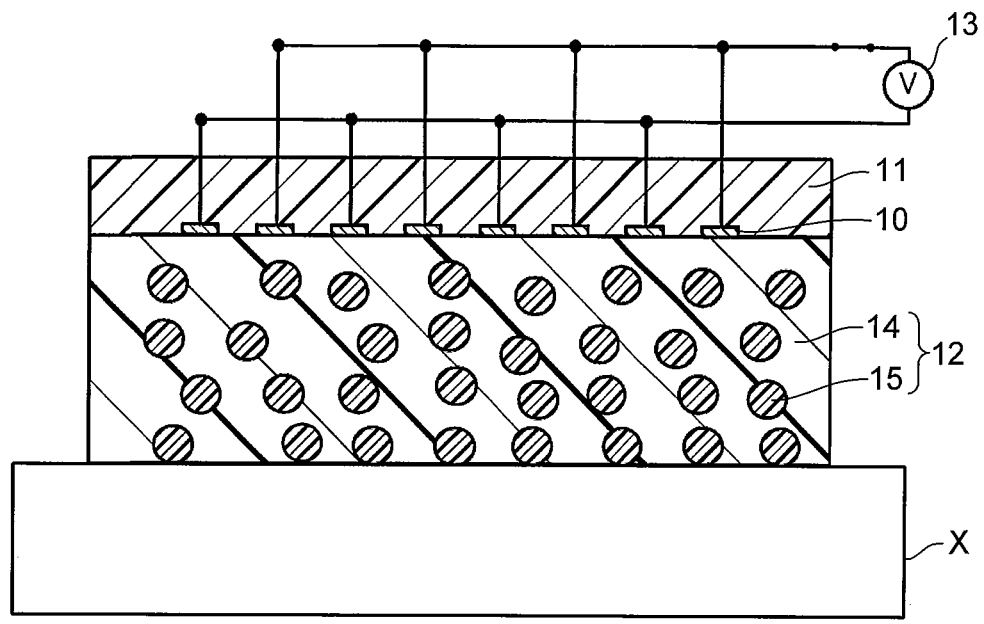
FIG. 3 is a cross-sectional view illustrating a state where voltage is applied to the electroadhesive element expressing body in the sonic device illustrated in FIG. 1.

The sonic propagation unit 3 is provided to be in contact with the wave transmitting-receiving surface (sonic function surface) 7b of the sonic transducer unit 2, and is fixed to the wave transmitting-receiving surface 7b of the sonic transducer unit 2 via, for example, an adhesive layer. The sonic propagation unit 3 includes a substrate 11 having a pair of positive and negative electrodes 10, an electroadhesive element expressing body 12 provided on an electrode formation surface of the substrate 11, and a power supply 13 which applies voltage to the electroadhesive element expressing body 12. The sonic propagation unit 3 is arranged so that the outer surface of the electroadhesive element expressing body 12 is in contact with a test object X as illustrated in FIG. 2 and FIG. 3. An ultrasonic wave emitted from the ultrasonic transmitting-receiving element 6 is propagated to the test object X via the wave receiving plate 7 and the sonic propagation unit 3. Further, the reflected wave reflected by the test object X is propagated to the ultrasonic transmitting-receiving element 6 via the sonic propagation unit 3 and the wave receiving plate 7.

The electroadhesive element expressing body 12 includes, as illustrated in FIG. 2 and FIG. 3, a resin crosslinked body 14 and particles 15 dispersed in the resin crosslinked body 14. The resin crosslinked body 14 and the particles 15 will be described later in detail. The power supply 13 has a switch which turns on and off the application of voltage to the electroadhesive element expressing body 12. FIG. 2 illustrates a state where no voltage is applied to the electroadhesive element expressing body 12, and FIG. 3 illustrates a state where voltage is applied to the electroadhesive element expressing body 12. In the electroadhesive element expressing body 12, the positional state of the resin crosslinked body 14 and the particles 15 dispersed therein changes due to the electric rheology effect, the stress of Maxwell and so on based on ON/OFF of the application of voltage from the power supply 13.

In other words, as illustrated in FIG. 2, in the state where no voltage is applied to the electrodes 10, a part of the particles 15 exist in a manner to project on the surface of the resin crosslinked body 14. Therefore, the electroadhesive element expressing body 12 has a surface low in pressure sensitive adhesion. Accordingly, in a state where the electroadhesive element expressing body 12 is in contact with the top of the test object X, the ultrasonic device 1 can be moved. The part of the particles 15 projecting on the surface of the resin crosslinked body 14 exhibit a lubricating function at the surfaces thereof and therefore can slide the electroadhesive element expressing body 12 on the surface of the test object X.

Figure 4:
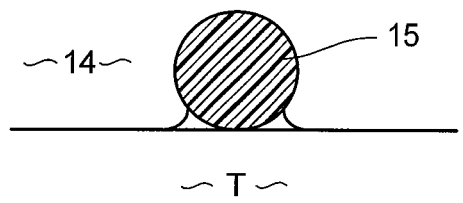
FIG. 4 is a cross-sectional view illustrating a state of particles on a surface of a resin crosslinked body of the electroadhesive element expressing body illustrated in FIG. 3.

FIG. 3 illustrates a state where voltage is applied to the electroadhesive element expressing body 12 illustrated in FIG. 2. As illustrated in FIG. 3, when voltage is applied to the electrodes 10, the particles 15 dispersed in the resin crosslinked body 14 move from the surface of the resin crosslinked body 14 in a depth direction, in other words, from the surface of the resin crosslinked body 14 in a direction of the substrate 11 and the resin crosslinked body 14 protrudes toward surface due to the electric rheology effect, the stress of Maxwell and so on. Accordingly, the resin crosslinked body 14 occupying the surface of the electroadhesive element expressing body 12 in contact with the test object X increases. Therefore, the surface of the electroadhesive element expressing body 12 comes into close contact with the test object X. At this time, with an increase in voltage applied to the electrodes 10, the adhesion of the electroadhesive element expressing body 12 to the test object X can be increased. It is conceivable that the reason why the adsorbability occurs at the application of voltage is that the resin crosslinked body 14 having a glass transition temperature equal to or lower than room temperature rises up to the surface and the particles 15 sink. Note that there is a case where a space is occupied by gas such as air occurs even if the resin crosslinked body 14 protrudes around the particle 15 as illustrated in FIG. 4 on the surface of the electroadhesive element expressing body 12 at the application of voltage, with exerting little or no influence on the transmission and reception of the sonic wave such as an ultrasonic wave.

Transmission and reception of the ultrasonic wave via the above-described electroadhesive element expressing body 12 in close contact with the test object X makes it possible to propagate, for example, the ultrasonic wave emitted from the ultrasonic transmitting-receiving element 6 to the test object X with intervening little or no air therebetween. Further, the reflected wave reflected by the test object X can also be received by the ultrasonic transmitting-receiving element 6 via the electroadhesive element expressing body 12 with intervening little or no air therebetween. Accordingly, the propagation efficiency of the ultrasonic wave by the ultrasonic device 1 such as the ultrasonic probe and the transmission/reception efficiency based thereon can be enhanced. Further, when it is desired to move the ultrasonic device 1, the application of voltage to the electroadhesive element expressing body 12 is turned off as described above to make it possible to move the ultrasonic device 1 with the electroadhesive element expressing body 12 in contact with the top of the test object X. Further, the resin crosslinked body 14 is, for example, gelatinous and therefore never adheres to and remains on the test object X.

The electroadhesive element expressing body 12 has the particles 15 dispersed in the resin crosslinked body 14 as described above. The particles 15 dispersed in the resin crosslinked body 14 are preferably particles exhibiting the electric rheology effect (electric rheology particles). Examples of the constituent material of the particles 15 include semiconductor, conductor, anisotropic conductor, ferroelectric, electrolyte, insulator and so on. Concrete examples of the particles 15 include ferroelectric particles of barium titanate ($BaTiO_3$), lead zirconate titanate, calcium titanate and so on, oxide particles of aluminum oxide, titanium oxide, zirconium oxide, lanthanum oxide and so on, resin particles of acrylics such as polystyrene, and polymethyl methacrylate, a divinylbenzene based copolymer, acene quinones, polyaniline, polyparaphenylene and so on, a carbonaceous particle, Ag colloid, Ni colloid, an anhydrous silica particle, a surface insulated conductive particle, or particles made by coating those particles with an organic compound such as urea or polymer.

The particles 15 may be made by mixing resin particles of acrylic resin and so on, and particles of barium titanate, lead zirconate titanate, calcium titanate, titanium oxide, zirconium oxide, lanthanum oxide, acene quinones, polyaniline, polyparaphenylene, carbonaceous, Ag colloid, Ni colloid, an anhydrous silica and so on, or a surface insulated conductive particle. Further, the particles 15 may be particles selected from a conductive polymer blend, a monomer such as a silicon monomer, an oligomer, and a mixture and a derivative and so on of them.

The particles 15 may be composite particles made by, for example, coating the surface of a spherical material with particles smaller than the spherical material. Examples of the material of the spherical particles include particles of various polymers, silica gel, starch, soybean casein, carbon and so on. For the small particles covering the peripheries of the particles, an inorganic oxide, an organic pigment such as various phthalocyanine compounds and the like can be used. Another material example of the electric rheology particles is a polymer chain with a base having a function of liquid crystal added. Further, in order to improve the dispersibility in the resin crosslinked body 14, various kinds of surface treatment and treatment agents can be used for the particles 15.

The resin crosslinked body 14 preferably has pressure sensitive adhesion and exhibits the electric rheology effect in a state where the particles 15 are dispersed therein. Here, the pressure sensitive adhesion is a kind of adhesion, and means adhesion only by applying small pressure at normal temperature in a short time without using water, solvent, heat or the like. The magnitude of the pressure sensitive adhesion is measured by how large force the resin crosslinked body 14 can stand when the resin crosslinked body 14 is brought into close contact with the test object X. Normally, the source of the force is said to be mainly Van der Waals force, and the resin crosslinked body 14 bites into a micro concave-convex surface of the test object X and gets closer thereto to thereby adhere thereto. Accordingly, the resin crosslinked body 14 constituting the electroadhesive element expressing body 12 preferably has a relatively low glass transition temperature, and the glass transition temperature is preferably lower than room temperature.

For the resin crosslinked body 14, a mixture of solid and liquid can be used. An example of the mixture is the one made by dispersing silicone oil in a gel skeleton formed of a polysiloxane cross-linked body. In the case of mixing silicone oil, it is preferable to form a resin crosslinked body by heat or light and then remove a part of the oil. By this process, the electroadhesive element expressing body 12 including the resin crosslinked body 14 becomes a porous structure in some cases. In this case, higher adhesion function is often exhibited. Here, the pore size of the porous structure is preferably smaller than the average particle size of the particles 15 used at the same time.

For the medium of the resin crosslinked body 14 constituting the electroadhesive element expressing body 12, for example, the one classified into a silicone gel represented by a dimethylpolysiloxane is used. The silicone gel is hardened with light, heat, a catalyst or the like, and a crosslinking initiator, a catalyst or the like is a constituent material of the electroadhesive element expressing body 12 in the production process. Other than the silicone gel, various materials can be used as long as they are electrically insulating media having so-called pressure sensitive adhesion. Examples thereof include a swollen gel forming a three-dimensional network structure by crosslinking and absorbing a solvent therein, a topological gel having eight unique crosslinking points utilizing polyrotaxane, a double network gel having independent double network structures and so on. Concrete examples include a polysiloxane crosslinked body, an acrylic ester-based polymer crosslinked body, a polystyrene-based crosslinked body and so on. The monomer, oligomer, unsaturated group-containing compound and so on being their constituent materials may be mixed.

In addition to the resin crosslinked body 14 and the particles 15, the electroadhesive element expressing body 12 may contain a charge transport material, conductive fine particles, a process oil represented by silicone oil, oxide particles and so on. Examples of the constituent material of the conductive fine particle include metals such as gold, silver, copper, platinum, aluminum, titanium, tungsten, tin, zinc, nickel, indium, zirconia and so on, tin oxide, carbon powder, fullerene, silicon carbide, graphite, graphene, acetylene black, carbon nano tube and so on. The electroadhesive element expressing body 12 contains the conductive fine particles and thereby can enhance the mobility of the particles 15 based on the electric rheology effect.

For the charge transport material, a material having charge transportation property used for an organic EL, an organic solar cell and the like is applicable. Examples of the charge transport material include poly(2-vinylcarbazole), poly(9-vinylcarbazole), 1,3,5-tri(2-(9-ethylcarbazole-3)ethylene)benzene, tri(4-carbazoyl-9-ylphenyl)amine, tris[4-(diethylamino)phenyl]amine, tri-p-tolylamine, 4,4'bis(N-carbazolyl)-1,1'-biphenyl, 4,4'-bis(N-carbazolyl)-1,1'-biphenyl, 1,3-bis(N-carbazolyl)benzene, 1,4-bis(diphenylamino)benzene, N,N'-bis(3-methylphenyl)-N,N'-diphenylbenzidine, poly(N-ethyl-2-vinylcarbazole), poly[bis(4-phenyl)(2,4,6-trimethylphenyl)amine, poly(1-vinylnaphthalene), poly(1-vinylnaphthalene), poly(2-vinylnaphthalene), poly(copper phthalocyanine) and so on. The movement of the particles 15 by the electric rheology effect is affected by charges applied from the power supply 13, so that the electroadhesive element expressing body 12 contains the charge transport material and thereby can enhance the electric rheology effect.

An example of the process oil is a silicone oil. The silicone oil is electrically and chemically stable and is a flame-retardant material, and is preferable as the process oil contained in the electroadhesive element expressing body 12. Representative examples of the silicone oil include dimethyl silicone oil, fluorine-modified silicone oil, phenyl-modified silicone oil, and so on. For the process oil, paraffinic oil, naphthenic oil or the like, other than the silicone oil, may be used. Besides, other than the above, a commercially available process oil may be used.

For the substrate 11 provided in contact with the electroadhesive element expressing body 12, for example, a resin film, a resin substrate or the like is used. The electrodes 10 formed on the substrate 11 are electrodes composed of a positive electrode and a negative electrode in a pair having shapes not particularly limited, but, for example, comb-shaped electrodes in which the positive electrode and the negative electrode are alternately arranged are used. Other than that, the electrodes 10 having a wiring pattern capable of arranging the positive electrode and the negative electrode on one surface of the electroadhesive element expressing body 12, for example, the electrodes 10 having various wiring patterns such as a fish bone shape, a spiral shape and the like are applicable. The width of and the interval between the positive electrode and the negative electrode in the electrodes 10 are appropriately selected depending on the thickness of the electroadhesive element expressing body 12, the size of the particles 15 or the like. In the case where the electroadhesive element expressing body 12 contains the conductive fine particles, the electrodes 10 preferably contain a metal having a work function having a difference from a work function of the conductive fine particle falling within 0.5 eV, thereby enhancing the electric rheology effect.

In the ultrasonic device 1 in the embodiment, the electroadhesive element expressing body 12 of the sonic propagation unit 3 is caused to exhibit pressure sensitive adhesion by applying voltage thereto, and the electroadhesive element expressing body 12 is brought into close contact with the surface of the test object X with intervening little or no air therebetween, thereby making it possible to efficiently realize propagation of the ultrasonic wave from the ultrasonic transmitting-receiving element 6 of the sonic transducer unit 2 stacked on the sonic propagation unit 3 to the test object X and from the test object X to the ultrasonic transmitting-receiving element 6. Here, a sound intensity transmittance T can be described by acoustic impedance. The transmittance of sound from a substance A to a substance B is acoustic impedance (acoustic impedance $Z_A$ of the substance A and acoustic impedance $Z_B$ of the substance B) being a product of the density of a substance and a sonic speed in the substance and expressed by the following Expression (1).

$$T=(2Z_A \cdot Z_B)/(Z_A+Z_B)^2 \qquad (1)$$

Figure 12:
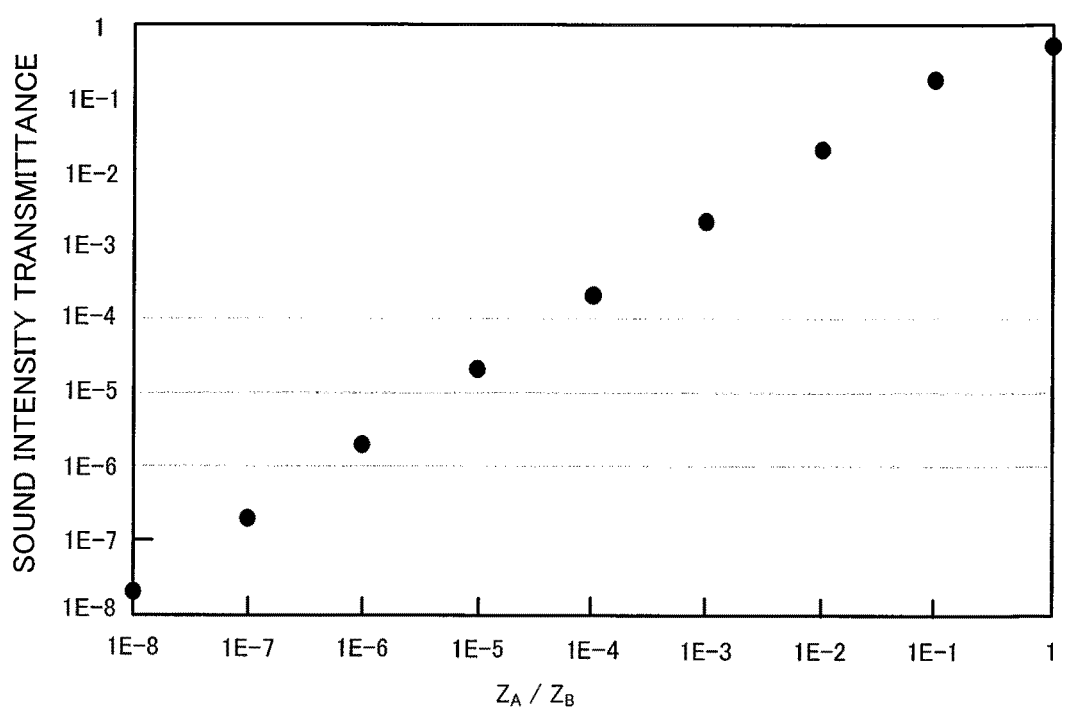
FIG. 12 is a graph illustrating the relation between an acoustic impedance ratio of a substance A and a substance B and the sound intensity transmittance.

The transmittance of the intensity of sound from the substance A to the substance B which uniformly exist in a planar state is calculated by Expression (1) and illustrated in FIG. 12. The acoustic impedance of air at a temperature of 0° C. is 0.43 KRayl, so that, for example, when the protective material of the ultrasonic transducer is polystyrene having an acoustic impedance of 2.5 MRayl, the ratio of them is $1.7 \times 10^{-4}$ (1.7 E −4), and therefore the sound intensity transmittance is 2.7 e −3 that is 1% or less. As described above, it is effective to arrange the electroadhesive element expressing body 12 so as to prevent air having an extremely small acoustic impedance from intervening between the test object X and the ultrasonic transducer 1.

For efficient propagation of a sonic wave, it is preferable that not only no air layer exists between the ultrasonic transducer and the test object X but also the material constituting the adhesive member is the one which efficiently propagates a sonic wave in use. In other words, it is desirable that the acoustic impedances of the main component of the resin crosslinked body 14 and the main component of the particles 15 which are the main members constituting the electroadhesive element expressing body 12 in this embodiment are not largely separate. The ratio of the acoustic impedances of the resin crosslinked body 14 and the particles 15 is preferably in a range of 0.001 or more and 1000 or less, and the ratio of the impedances is more preferably in a range of 0.01 or more and 100 or less and desirably in a range of 0.1 or more and 10 or less. Besides, the size of the particle 15 is ½ or less of the wavelength of the sonic wave in use, and more preferably ⅕ or less. In such a case, even if the acoustic impedance of the resin crosslinked body 14 being the insulating medium and the acoustic impedance of the particles 15 are largely different, the propagation of the sonic wave is not greatly influenced in some cases.

For example, the acoustic impedance of silicone rubber at room temperature of 25° C. is about 1.0 MRalys and that of polystyren is about 2.5 MRalys, and the ratio of them is about 0.4. In the case of using silicone rubber as the insulating medium of the resin crosslinked body 14 and using particles composed of polystyren as a main component as the particles 15, an ultrasonic test can be performed without any problem though depending on the thickness of the electroadhesive element expressing body 12 and the particle size of the particles 15.

The particles 15 constituting the electroadhesive element expressing body 12 can be appropriately selected and used from among particles having an average particle size normally being a diameter of 0.1 μm or more and 100 μm or less. The average particle size herein means a standard particle equivalent particle size by a Coulter counter. The particle size distribution is appropriately selected depending on the usage. When the particle size of the particles 15 is smaller than the wavelength in the electroadhesive element expressing body 12 of the sonic wave in use, the sonic wave can be propagated without delay. In other words, the average particle size of the particles 15 is preferably smaller than the length of ⅕ of the wavelength in the electroadhesive element expressing body 12 of the sonic wave in use. The longitudinal wave sonic speed of the electroadhesive element expressing body 12 is about 500 to 3000 m/s. On the other hand, the frequency of the ultrasonic wave in use is about 1 to 10 MHz. For example, when the longitudinal wave sonic speed is 1000 m/s, the wavelength of the ultrasonic wave of 10 MHz is 100 μm. Though appropriately selected depending on the frequency of the ultrasonic wave in use, the diameter of the particles 15 is often desirably 100 μm or less.

In the ultrasonic device 1 in the embodiment, it is preferable to prevent an air layer that hinders propagation of sound from occurring between the test object X and the ultrasonic transducer 2. To this end, an optimal particle size distribution of the particles 15 is selected depending on the surface roughness of the test object X. More specifically, the particles 15 are exposed to the surface of the electroadhesive element expressing body 12 as described above and enable the electroadhesive element expressing body 12 to slide on the test object X before application of voltage. Upon application of voltage, the particles 15 existing on the surface sink in and the resin crosslinked body 14 therearound rise up at the same time to eliminate the air layer. Keeping the state of the particles 15 exposed on the surface without sinking in the resin crosslinked body 14 in the state where no voltage is applied to the electroadhesive element expressing body 12 can be realized by selection of the rigidity of the resin crosslinked body 14 and the particle size of the particles 14.

With an increase in application voltage, the degree of close contact increases to further eliminate the air layer, but there are air bubbles not eliminated but remaining. If the sizes of the air bubbles not eliminated but remaining are large or their density is high, a trouble occurs in sound propagation. The size of the air bubble is preferably small of about ½ to ⅕ of the wavelength of the sound in use. For example, in the case of using the sound having a frequency of 3.5 MHz, the wavelength in the air is about 100 μm. Accordingly, the diameter of the air bubble is preferably of a size of about 10 μm to 50 μm. To realize the above, the size of the particles 15 being the constituent material of the electroadhesive element expressing body 12 is preferably 100 μm or less, and more preferably 30 μm or less.

Figure 5:
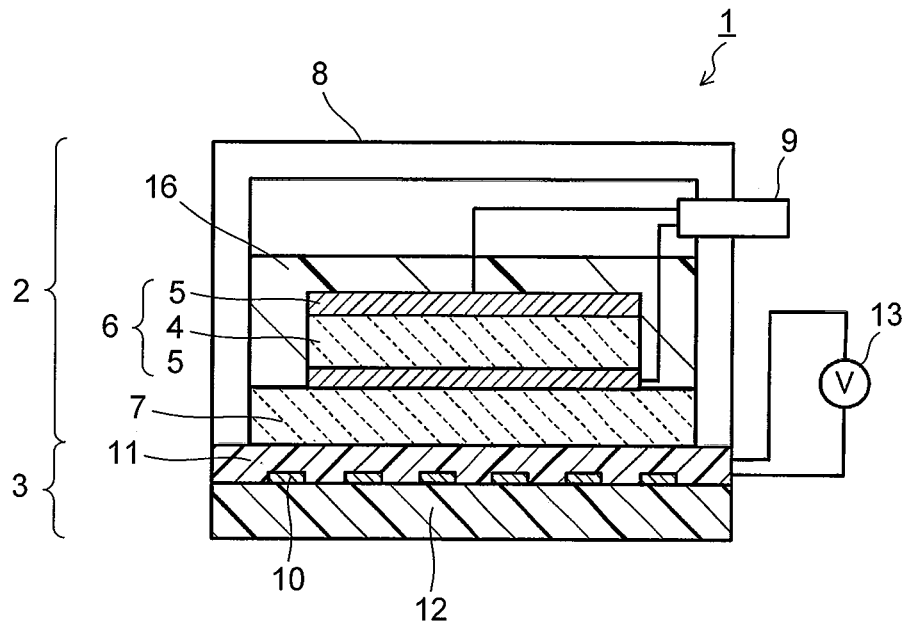
FIG. 5 is a cross-sectional view illustrating a first modified example of the sonic device in the first embodiment.
Figure 6:
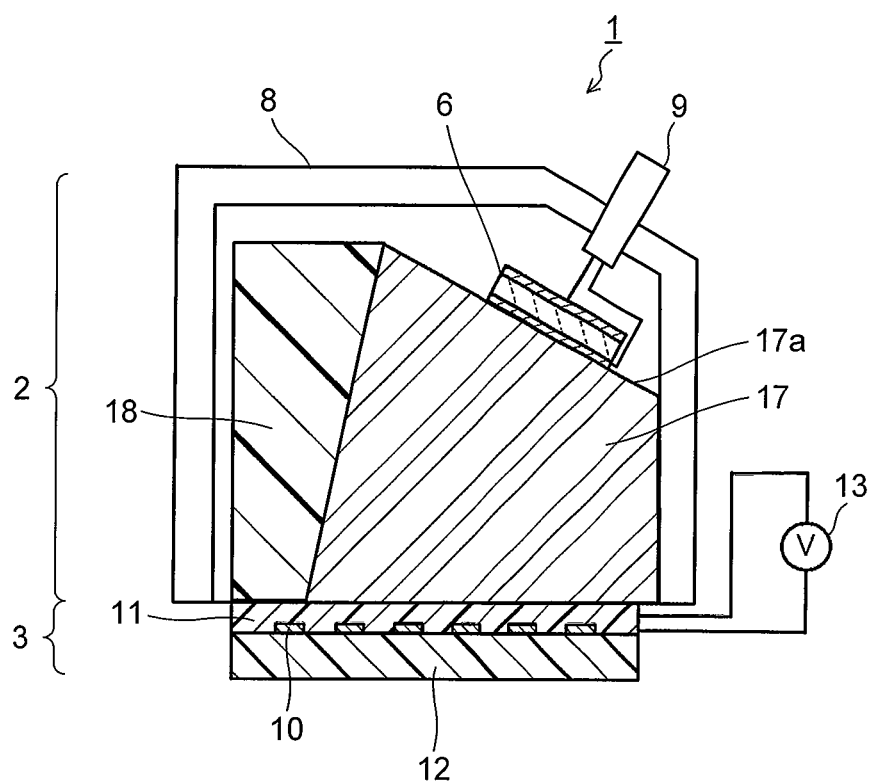
FIG. 6 is a cross-sectional view illustrating a second modified example of the sonic device in the first embodiment.
Figure 7:
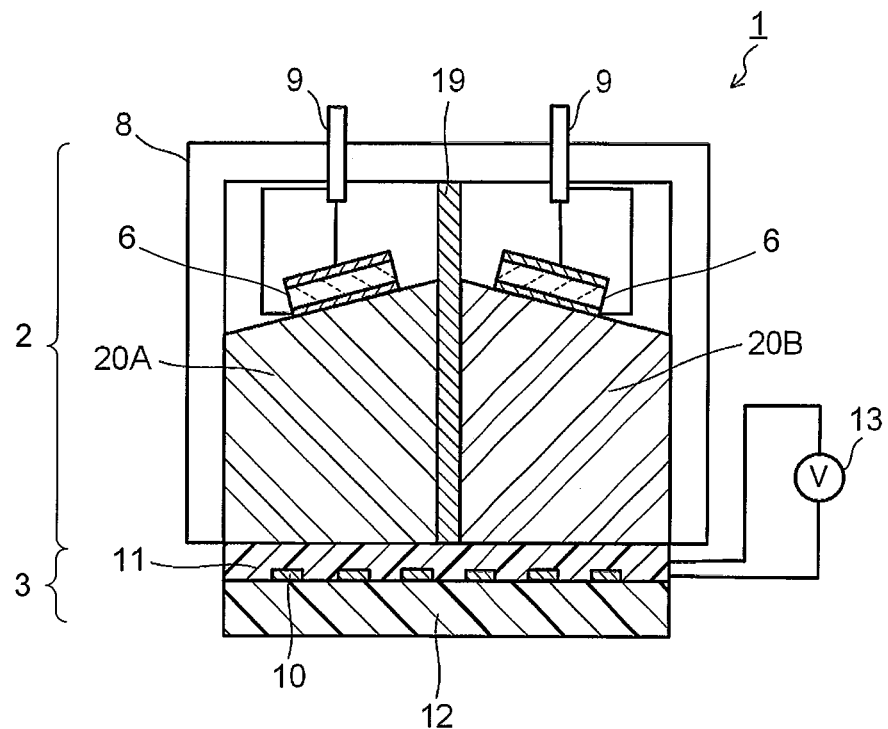
FIG. 7 is a cross-sectional view illustrating a third modified example of the sonic device in the first embodiment.

In the ultrasonic device in the first embodiment, the structure of the sonic transducer unit (ultrasonic transducer) 2 having the transmitting function and the receiving function for the ultrasonic wave is not limited to the structure as the vertical type ultrasonic probe illustrated in FIG. 1. To the sonic transducer unit (ultrasonic transducer) 2, various publicly-known structures are applicable. For example, FIG. 5 illustrates an ultrasonic device 1 as a broadband-type ultrasonic probe in which a damper 16 is arranged on the back side of the ultrasonic transmitting-receiving element 6. FIG. 6 illustrates an ultrasonic device 1 as an angle ultrasonic probe. In the ultrasonic device 1 as the angle ultrasonic probe illustrated in FIG. 6, the ultrasonic transmitting-receiving element 6 is provided on an inclined surface 17a of a wedge 17 and a sound absorbing material 19 is arranged on the back of the ultrasonic transmitting-receiving element 6. FIG. 7 illustrates an ultrasonic device 1 as a dual vibrator-type ultrasonic probe. In the ultrasonic device 1 as the dual vibrator-type ultrasonic probe illustrated in FIG. 7, the ultrasonic transmitting-receiving element 6 is provided at each of acoustic delay materials 20A, 20B arranged via an acoustic isolation film 19. Also in these ultrasonic devices 1, the propagation efficiency of the ultrasonic wave and the transmission/reception efficiency based thereon can be enhanced by providing the sonic propagation unit 3 having the electroadhesive element expressing body 12 on the ultrasonic transmitting-receiving surface of the sonic transducer unit (ultrasonic transducer) 2.

Second Embodiment

Figure 8:
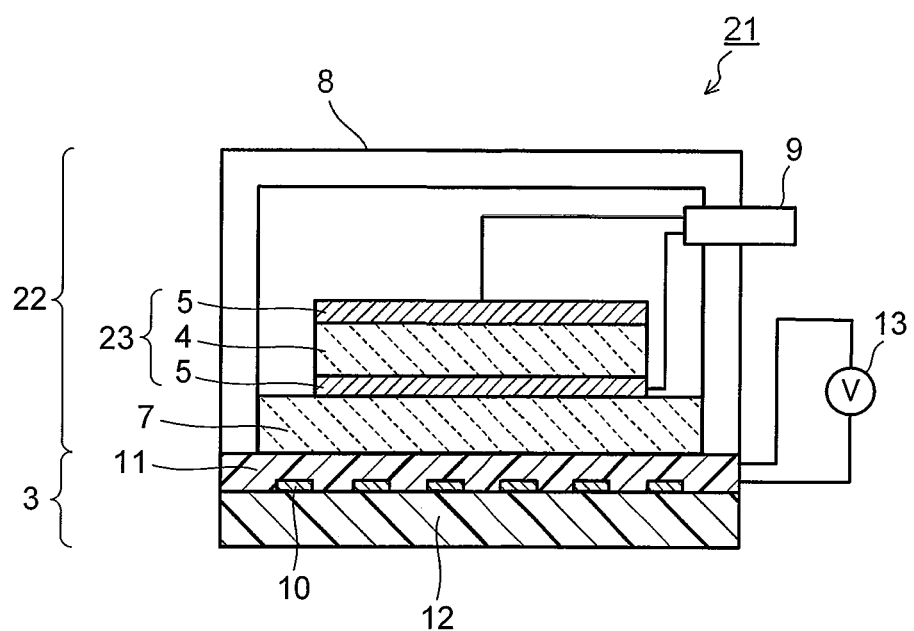
FIG. 8 is a cross-sectional view illustrating a sonic device in a second embodiment.

Next, a sonic device 21 in a second embodiment will be described referring to FIG. 8 through FIG. 11. FIG. 8 through FIG. 11 illustrate the sonic device 21 including an AE sensor being one example of the sonic receiver. FIG. 8 illustrates the sonic device 21 including a resonance-type AE sensor. The sonic device 21 illustrated in FIG. 8 includes a sonic transducer unit (AE sensor) 22 having a receiving function for a sonic wave, and a sonic propagation unit 3 provided on a wave receiving surface (sonic function surface) for a sonic wave of the sonic transducer unit 2. A concrete configuration of the sonic propagation unit 3 is the same as that in the first embodiment. The sonic transducer unit 2 as the AE sensor has the same configuration as that of the ultrasonic device 1 illustrated in FIG. 1 except that the piezoelectric body as the vibrator 4 uses a sonic receiving element 23 having the material and structure according to the AE sensor.

The sonic device 21 including the sonic transducer unit (AE sensor) 22 can be attached to the test object X because the electroadhesive element expressing body 12 of the sonic propagation unit 3 exhibits pressure sensitive adhesion at the time of application of voltage as described above. Further, since the electroadhesive element expressing body 12 can be brought into close contact with the test object X via no air at the time of attachment, the propagation efficiency of the sonic wave by AE (Acoustic Emission) and the reception efficiency based thereon can be enhanced. Further, in the case of moving the sonic device 21, the sonic device 21 can be easily moved because the electroadhesive element expressing body 12 exhibits a slip property when the application of voltage is turned off.

Figure 9:
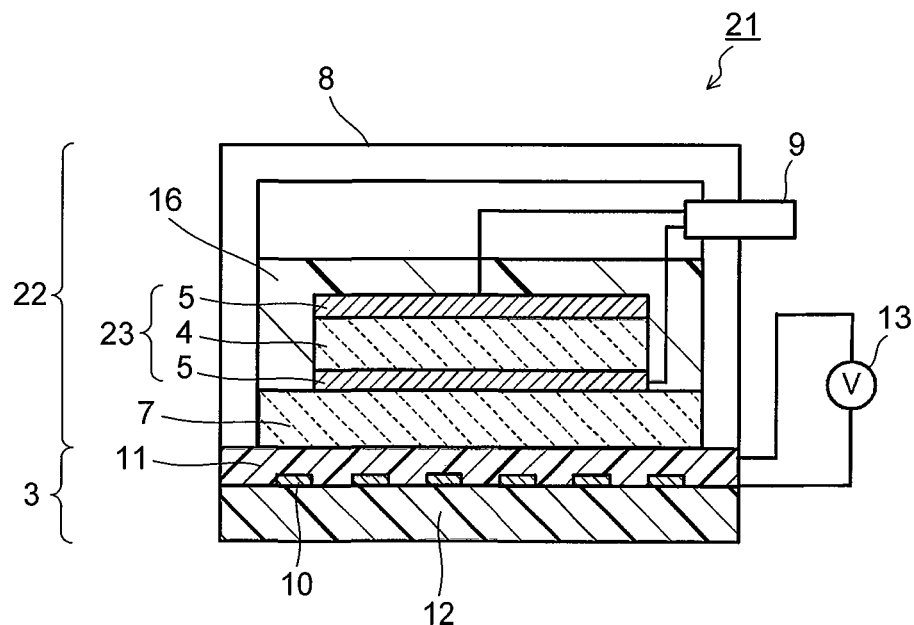
FIG. 9 is a cross-sectional view illustrating a first modified example of the sonic device in the second embodiment.
Figure 10:
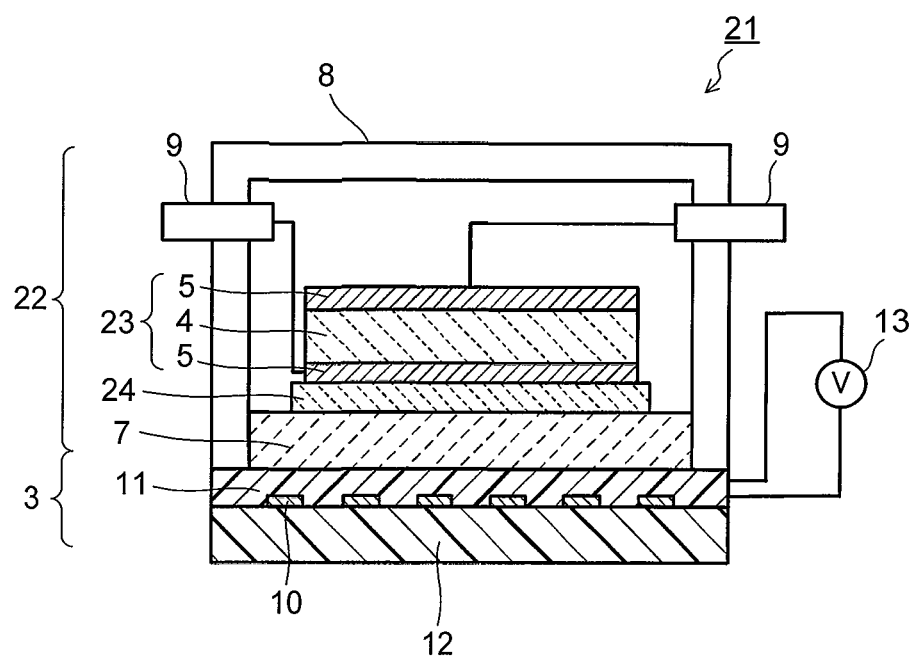
FIG. 10 is a cross-sectional view illustrating a second modified example of the sonic device in the second embodiment.
Figure 11:
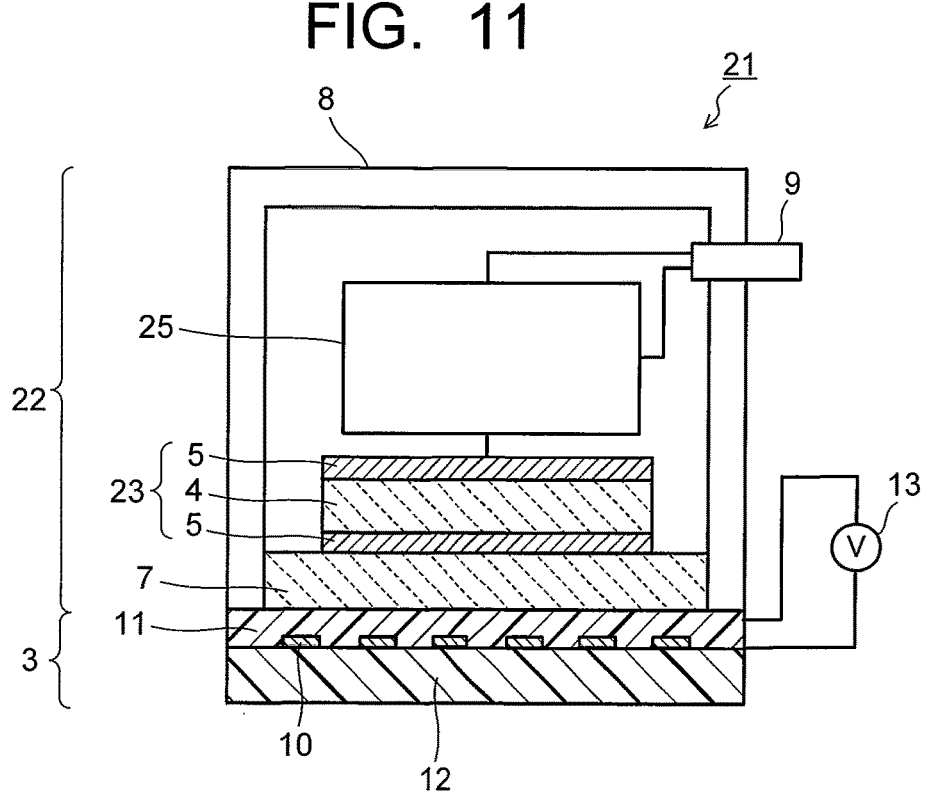
FIG. 11 is a cross-sectional view illustrating a third modified example of the sonic device in the second embodiment.

A concrete configuration of the sonic device 21 including the AE sensor is not limited to the sonic device 21 including the resonance-type AE sensor illustrated in FIG. 8. To the sonic transducer unit (AE sensor) 22, various publicly-known structures are applicable. For example, FIG. 9 illustrates a sonic device 21 as a broadband-type AE sensor in which a damper 16 is arranged on the back side of the sonic receiving element 23. FIG. 10 illustrates a sonic device 21 as a balance-type AE sensor. In the sonic device 21 illustrated in FIG. 10, the sonic receiving element 23 is mounted on an insulating plate 24. FIG. 11 illustrates a sonic device 21 as a preamplifier built-in-type AE sensor. The sonic device 21 illustrated in FIG. 11 includes a preamplifier 25 arranged in a case 8. Also in these sonic devices 21, the propagation efficiency of the sonic wave and the reception efficiency based thereon can be enhanced while attachment and movement of the sonic devices 21 are facilitated, by providing the sonic propagation unit 3 having the electroadhesive element expressing body 12 on the sonic receiving surface of the sonic transducer unit (AE sensor) 22.

Third Embodiment

Figure 13:
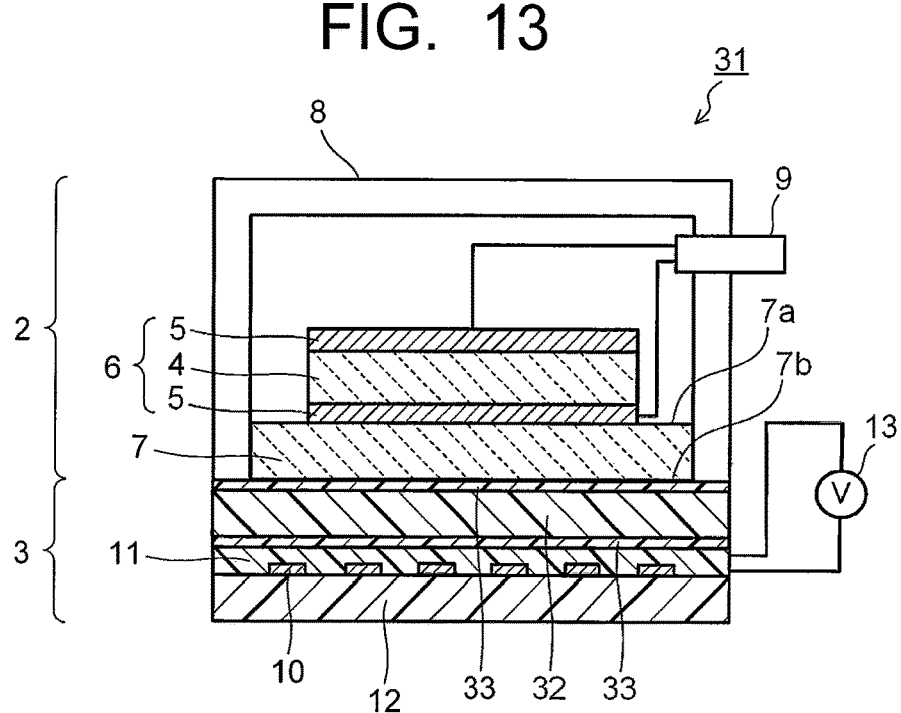
FIG. 13 is a cross-sectional view illustrating a sonic device in a third embodiment.

Next, a sonic device 31 in a third embodiment will be described referring to FIG. 13. FIG. 13 indicates a vertical type ultrasonic probe being one example of an ultrasonic transducer. The ultrasonic device 31 as the vertical type ultrasonic probe includes the sonic transducer unit (ultrasonic transducer) 2 having a transmitting function and a receiving function for an ultrasonic wave, and a sonic propagation unit 3 provided on the sonic function surface which functions as a wave transmitting surface and a wave receiving surface for the sonic wave of the sonic transducer unit 2 in the same as the first embodiment. The sonic transducer unit (ultrasonic transducer) 2 has the same configuration as that of the ultrasonic device 1 of the first embodiment. The sonic propagation unit 3 includes, as with the first embodiment, the substrate 11 having a pair of positive and negative electrodes 10, the electroadhesive element expressing body 12 provided on the electrode formation surface of the substrate 11, and the power supply 13 which applies voltage to the electroadhesive element expressing body 12, and includes additionally a polymer-containing layer 32.

The sonic propagation unit 3 including the polymer-containing layer 32 will be described in detail as following. The polymer-containing layer 32 is arranged between the wave transmitting-receiving surface (sonic function surface) 7b of the sonic transducer unit 2, in other word, a surface 7b opposite to a surface 7a in contact with the ultrasonic transmitting-receiving element 6 of the wave receiving plate 7, and a surface (back surface) opposite to an electrode formation surface (front surface) of the substrate 11. The polymer-containing layer 32 is fixed to the wave transmitting-receiving surface 7b of the sonic transducer unit 2 and the back surface of the substrate 11 via an adhesive layer 33 each other. In the sonic device 31 of the third embodiment, an ultrasonic wave emitted from the ultrasonic transmitting-receiving element 6 is propagated to the test object via the wave receiving plate 7, the polymer-containing layer 32, the substrate 11, and the electroadhesive element expressing body 12. Further, the reflected wave reflected by the test object is propagated to the ultrasonic transmitting-receiving element 6 via the wave receiving plate 7, the polymer-containing layer 32, the substrate 11, and the electroadhesive element expressing body 12.

The polymer-containing layer 32 has Young's modulus of 1 GPa or less. Even if micro-order concave-convex portions are formed on a surface of the test object, or a curvature of the surface of the sonic propagation unit 3 is different from that of the surface of the test object, such a polymer-containing layer 32 is arranged between the sonic transducer unit 2 and the substrate 11 of the sonic propagation unit 3, and thereby, traceability of the electroadhesive element expressing body 12 against the surface of the test object can be enhanced. Accordingly, the propagation efficiency of the ultrasonic wave between the sonic propagation unit 3 and the test object, and the transmission/reception efficiency based thereon is enhanced, and therefore, in case that micro-order concave-convex portions are formed on the surface of the test object, or the curvature of the surface of the sonic propagation unit 3 is different from that of the surface of the test object, the accuracy of the ultrasonic testing can be enhanced.

As described above, the polymer-containing layer 32 has Young's modulus of 1 GPa or less. By such a polymer-containing layer 32, the traceability of the electroadhesive element expressing body 12 against the surface of the test object can be enhanced. The strain (S), the normal stress (NS), and the Young's modulus (E) are expressed by the following Expression (2).

$$E = NS/S \quad (2)$$

Examples of the concave-convex portions includes a spot welding mark. It is reported that height of the concave-convex portion of spot welding is about 2 μm to 20 μm, and thereby, it is demanded to follow such a concave-convex portion. When a thickness of the polymer-containing layer 32 is 20 mm, it is necessary to cause the strain calculated by the following Expression (3) in order to follow 20 μm of the concave-convex portion.

$$NS = 20 \times 10^{-6}/2 \times 10^{-3} = 1 \times 10^{-2} \quad (3)$$

When the Stress of 1 kilogram-weight (kgw) (=about 10 MPa) is applied, the compressive elastic modulus of 1 GPa calculated by the following Expression (4) is necessary for the polymer-containing layer 32.

$$10 \text{ MPa}/1 \times 10^{-2} = 1 \text{ GPa} \quad (4)$$

The compressive elastic modulus becomes the same value as the Young's modulus which is a tensile elastic modulus in some cases. Accordingly, when the polymer-containing layer 32 has Young's modulus of 1 GPa or less, in order to follow 20 μm of the concave-convex portion, it is possible to follow 20 μm or less of the concave-convex portion. Therefore, the polymer-containing layer 32 has Young's modulus of 1 GPa or less. The polymer-containing layer 32 preferably has Young's modulus of 0.7 GPa or less.

As the constituent material of the polymer-containing layer 32, resin, rubber, elastomer and so on can be used. Examples of the polymer material having Young's modulus of 1 GPa or less include polyvinylidene chloride in vinyl series, acrylonitrile-butadiene-styrene copolymer, polyethylene, ethylene-vinyl acetate copolymer in polystyrene series, polytetrafluoroethylene, vinylidene fluoride in fluorine resin series and so on. Further, olefin series, styrene series, vinyl chloride series, urethane series, polyester series, polyamide series and so on which are classified in thermoplastic elastomer, and urethane rubber, silicone rubber, fluorine-contained rubber and so on which are classified in thermoset elastomer also can be used as the constituent material of the polymer-containing layer 32 having Young's modulus of 1 GPa or less.

Examples of the material having lower Young's modulus include a slide-ring elastomer. The slide-ring elastomer is a slide-ring polymer material represented by a polyrotaxane structure known as a material having an extremely low Young's modulus. The rotaxane has a cyclic molecule and a rod-like molecule penetrated therein, and bulky portions are connected to both ends of axes, and thereby, the ring does not slip from the axis. The structural characteristics of the polyrotaxane are classified in following three. That is, (1) a covalent bond does not exist between a ring-shaped molecule and a linear molecule, (2) rotary and sliding motion of ring-shaped molecules is possible along the circumference of the linear molecule, and (3) it is possible to impart a function by chemically modifying the ring-shaped molecule in the polyrotaxane.

The slide-ring elastomer can be used as the constituent material of the polymer-containing layer 32. Further, the polyrotaxane made using polyethyleneglycol as a raw material of the rod-like molecule, cyclodextrin derivative as a raw material of the cyclic molecule, and adamantine as a raw material of the capping molecule in the slide-ring elastomer is suitable for the constituent material of the polymer-containing layer 32. Specifically, the elastomer cross-linked by blending other polymer into the polyrotaxane grafted polycaprolactone and so on has exceedingly small Young's modulus so that it is about 1 KPa. By using such the elastomer as the constituent material of the polymer-containing layer 32, the traceability of the sonic propagation unit 3 against the concave-convex surface of the test object can be enhanced still more.

A thickness of the polymer-containing layer 32 is preferably selected according as a surface shape and so on of the test object, and is preferably in a range of 1 mm or more and 50 mm or less. If the thickness of the polymer-containing layer 32 is less than 1 mm, the traceability of the sonic propagation unit 3 against the concave-convex surface of the test object cannot be enhanced enough. If the thickness of the polymer-containing layer 32 is over 50 mm, the wave propagation such the ultrasonic wave may lower. The polymer-containing layer 32 should contain the above described polymer material, and have Young's modulus of 1 GPa or less as the whole layer. The polymer-containing layer 32 may contain components other than the polymer material as a main component.

In order to improve characteristics of the polymer-containing layer 32, the various components can be added in the polymer-containing layer 32 as far as Young's modulus does not exceed 1 GPa. For example, the particles are contained in the polymer-containing layer 32, and it is possible to improve elastic modulus and durability of the polymer-containing layer 32. The polymer-containing layer 32 may contain semiconductor particles, conductor particles, anisotropic conductor particles, ferroelectric particles, electrolyte particles, insulator particles and so on. Examples of the particles include ferroelectric particles of barium titanate, lead zirconate titanate, calcium titanate and so on, oxide particles of aluminum oxide, titanium oxide, zirconium oxide, lanthanum oxide and so on, resin particles of acrylics such as polystyrene, and polymethyl methacrylate, a divinylbenzene based copolymer, acene quinones, polyaniline, polyparaphenylene and so on, a carbonaceous particle, Ag colloid, Ni colloid, an anhydrous silica particle, a surface insulated conductive particle, or these mixture, or particles made by coating those particles with an organic compound such as urea or polymer. The particles may be particles selected from a conductive polymer blend, a monomer such as a silicon monomer, an oligomer, and a mixture and a derivative and so on of them. The particles may be composite particles made by, for example, coating the surface of a spherical material with particles smaller than the spherical material. Examples of the material of the spherical particles include particles of various polymers, silica gel, starch, soybean casein, carbon and so on. For the small particles covering the peripheries of the particles, an inorganic oxide, an organic pigment such as various phthalocyanine compounds and the like can be used.

Further, the polymer-containing layer 32 may contain a charge transport material, conductive fine particles, a process oil represented by silicone oil, oxide particles and so on. Examples of the constituent material of the conductive fine particle include metals such as gold, silver, copper, platinum, aluminum, titanium, tungsten, tin, zinc, nickel, indium, zirconia and so on, tin oxide, carbon powder, fullerene, silicon carbide, graphite, graphene, acetylene black, carbon nano tube and so on.

For the charge transport material, a material having charge transportation property used for an organic EL, an organic solar cell and the like is applicable. Examples of the charge transport material include poly(2-vinylcarbazole), poly(9-vinylcarbazole), 1,3,5-tri(2-(9-ethylcarbazole-3)ethylene)benzene, tri(4-carbazoyl-9-ylphenyl)amine, tris[4-(diethylamino)phenyl]amine, tri-p-tolylamine, 4,4'bis(N-carbazolyl)-1,1'-biphenyl, 4,4'-bis(N-carbazolyl)-1,1'-biphenyl, 1,3-bis(N-carbazolyl)benzene, 1,4-bis(diphenylamino)benzene, N,N'-bis(3-methylphenyl)-N,N'-diphenylbenzidine, poly(N-ethyl-2-vinylcarbazole), poly[bis(4-phenyl)(2,4,6-trimethylphenyl)amine, poly(1-vinylnaphthalene), poly(1-vinylnaphthalene), poly(2-vinylnaphthalene), poly(copper phthalocyanine) and so on.

The substrate 11 and the electroadhesive element expressing body 12 in the sonic propagation unit 3 can have the same configuration as that of the first embodiment, but a flexible resin substrate is preferably applied to the substrate 11. A material of flexible resin substrate is preferably one which can follow shape fluctuation of the polymer-containing layer 32, and more preferably one which can follow the smaller concave-convex portion by improving material or thickness thereof. For the flexible resin substrate, the resin substrate known as a flexible substrate can be used. As a flexible substrate, the substrate having a base film such a polyimide film or polyethylene terephthalate film having heat resistance and a metallic foil stuck on the base film such a copper foil as an electrode material or wiring material is known. Further, a flexible substrate using an extensible material as a base film is known as a substrate which is superior in flexibility and traceability against the concave-convex portion. The extensible material is so-called rubber or elastomer, and has good applicability for a curved face, a steric face and so on. Examples of rubber materials include styrene-butadiene rubber, butadiene rubber, chloroprene rubber, acrylonitrile rubber, butyl rubber, nitrile rubber, ethylene-propylene rubber, acrylic rubber, urethane rubber, silicone rubber, fluororubber, polysulfide rubber and so on. Examples of elastomer materials include olefin series, styrene series, vinyl chloride series, urethane series, polyester series, polyamide series and so on. The flexible resin substrate can be preferably used for not only the third embodiment but also the above described first and second embodiment.

In the sonic device 31 of the third embodiment, the electroadhesive element expressing body 12 of the sonic propagation unit 3 is caused to exhibit pressure sensitive adhesion by applying voltage thereto, and the electroadhesive element expressing body 12 is brought into close contact with the surface of the test object with intervening little or no air therebetween, thereby making it possible to efficiently realize propagation of the ultrasonic wave from the ultrasonic transmitting-receiving element 6 of the sonic transducer unit 2 stacked on the sonic propagation unit 3 to the test object and from the test object to the ultrasonic transmitting-receiving element 6. As described above, the ultrasonic wave emitted from the ultrasonic transmitting-receiving element 6 and the ultrasonic wave reflected from test object is propagated via the wave receiving plate 7, the polymer-containing layer 32, the substrate 11, and the electroadhesive element expressing body 12. The sound intensity transmittance T can be described by acoustic impedance, and the transmittance of sound from the substance A to the substance B is expressed by the above described Expression (1).

For efficient propagation of a sonic wave, it is preferable that not only no air layer exists between the sonic propagation unit 3 and the test object but also a sonic wave in use efficiently propagates in an interface of the polymer-containing layer 32 and the wave receiving plate 7 and into the material constituting the polymer-containing layer 32. In other words, it is desirable that the acoustic impedances of the polymer-containing layer 32 and the wave receiving plate 7, and the substrate 11 are not largely separate. The ratio of the acoustic impedances of the resin as the main component of the polymer-containing layer 32 and the main components of the wave receiving plate 7 and the substrate 11 is preferably in a range of 0.001 or more and 1000 or less, and the ratio of the impedances is more preferably in a range of 0.01 or more and 100 or less and desirably in a range of 0.1 or more and 10 or less. The ratio of the acoustic impedances in the electroadhesive element expressing body 12 and the ratio of the particle size and the wavelength of the sonic wave are the same as that in the first embodiment. According to the ultrasonic device 31, the supersonic wave can be transmitted and received efficiently via the sonic propagation unit 3 including the polymer-containing layer 32.

In the third embodiment, the sonic propagation unit 3 including the polymer-containing layer 32 is applied to the vertical type ultrasonic probe, but is not limited to it. The sonic propagation unit 3 including the polymer-containing layer 32 can be applied to the ultrasonic device 1 as the broadband-type ultrasonic probe illustrated in FIG. 5, the ultrasonic device 1 as the angle ultrasonic probe illustrated in FIG. 6, the ultrasonic device 1 as the dual vibrator-type ultrasonic probe illustrated in FIG. 7 and so on. Further, the sonic propagation unit 3 including the polymer-containing layer 32 may be applied to not only the ultrasonic device as the ultrasonic transducer but also the sonic device 21 including the AE sensor being one example of the sonic receiver in the second embodiment, that is, the sonic devices 21 illustrated in FIG. 8 to FIG. 11.

Fourth Embodiment

Figure 14:
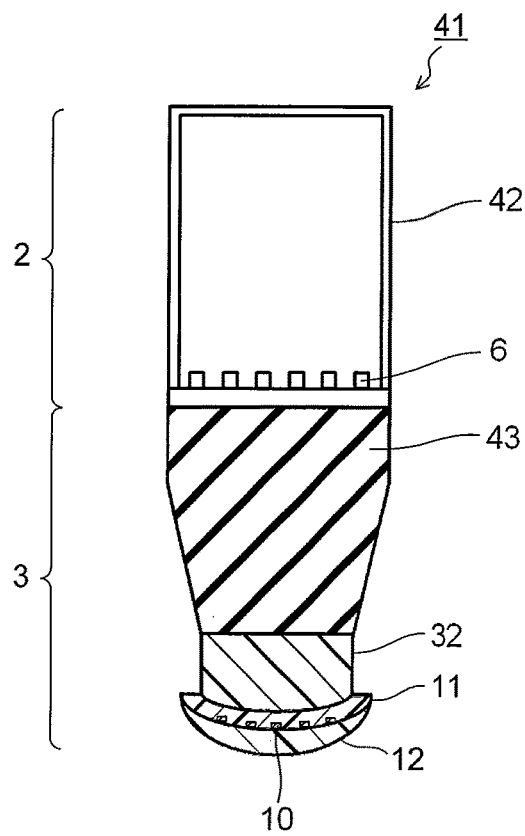
FIG. 14 is a cross-sectional view illustrating a sonic device in a fourth embodiment.

Next, a sonic device 41 in a fourth embodiment will be described referring to FIG. 14. FIG. 14 indicates an ultrasonic probe being one example of an ultrasonic transducer. The ultrasonic device 41 can be used as a probe for an inspection of spot welding, and includes the sonic transducer unit 2 having a transmitting function and a receiving function for an ultrasonic wave and the sonic propagation unit 3 in the same as the first embodiment. The ultrasonic transducer 42 as the sonic transducer unit 2 includes plural ultrasonic transmitting-receiving elements 6 (piezoelectric element) which are arranged in matrix form or array form. The basic configuration of the ultrasonic transmitting-receiving element 6 is the same as that in the first embodiment.

The sonic propagation unit 3 includes a shoe member 43, a polymer-containing layer 32, a substrate 11 having a pair of positive and negative electrodes 10, and a electroadhesive element expressing body 12, provided on a wave transmitting-receiving surface (sonic function surface) of an ultrasonic wave in the ultrasonic transducer 42 in this order. The concrete configurations of the substrate 11, the electrodes 10, and the electroadhesive element expressing body 12 are the same as that in the first embodiment. The concrete configuration of the polymer-containing layer 32 is the same as that in the third embodiment, and is the layer containing the polymer material of Young's modulus of 1 GPa or less, for example, the slide-ring polymer as a main component. The polymer-containing layer 32 preferably contains the slide-ring polymer. It is preferably that the substrate 11 is the flexible resin substrate in the same as the third embodiment.

The polymer-containing layer 32 which is the layer containing the slide-ring polymer and so on has preferably a thickness of 1 mm or more and 50 mm or less. Further, the polymer-containing layer 32 has a shape with a central region and a peripheral region, and a thickness of the central region is thicker than that of the peripheral region, and whole thickness of such a shape including the central region and the peripheral region is in a range of 1 mm or more and 50 mm or less. The central region means no peripheral region. The polymer-containing layer 32 has a convex shape which a portion positioned in the region inside than the peripheral region is thicker than the peripheral region. A surface of the convex shape of the polymer-containing layer 32 has a curved convex surface, that is, a curved surface having a projected central region. The convex shape is not limited this, and may be a shape having a projected other portion partially. The substrate 11 is the flexible resin substrate, and curve in a shape followed the curved convex surface of the polymer-containing layer 32, and the electroadhesive element expressing body 12 is the same.

According to the polymer-containing layer 32 having the shape of which the central region is thicker than the peripheral region, in the case that a concave portion exists in a surface of the test object, the supersonic wave can be transmitted and received efficiently to/from the test object, and an accuracy of the ultrasonic testing and so on can be improved. The transmission/reception of the ultrasonic wave is conducted in the same as the third embodiment except the shoe member 43 intervenes. The effect based on the electroadhesive element expressing body 12 is similar to the first embodiment.

EXAMPLES

Hereinafter, examples and their evaluation results will be described.

Example 1, Comparative Example 1

An electroadhesive element expressing body composed of a resin crosslinked body having electric rheology particles dispersed therein was prepared first. More specifically, the electric rheology particles made by embedding barium titanate fine particles having an average particle size of 200 nm in acrylic resin fine particles having an average particle size of 10 μm were prepared. 50 pts. wt. (part by weight) of the produced electric rheology particles and 9 pts. wt. of poly (9-vinylcarbazole) were dispersed in 20 pts. wt. of silicone oil. Then, 15 pts. wt. of silicone oligomer was dispersed in the dispersion liquid to form a uniform solution. Further, 1.5 pts. wt. of a crosslinking agent was added and dispersed therein. Subsequently, a PET resin sheet having comb-shaped electrodes having the positive electrode and the negative electrode formed thereon was prepared, and the above-described solution was applied onto the sheet and hardened. Samples changed in thickness of the electroadhesive element expressing body by changing the conditions in hardening were produced, and the samples were finally brought into close contact with a degreasing film to remove a part of the silicone oil, thereby producing five kinds of samples (Examples 1-a to 1-e).

The produced electroadhesive element expressing bodies were loaded on the broadband-type vertical ultrasonic probe (ultrasonic transducer unit) illustrated in FIG. 5 to produce five kinds of ultrasonic devices (Examples 1-a to 1-e). The ultrasonic devices were put on a SUS substrate with flaws therein being a test object so that the electroadhesive element expressing bodies were in contact with the test object, and peak values of the received waveform of the ultrasonic wave when applying no voltage and when applying a voltage of 500 V were compared. Note that an ultrasonic wave having a frequency of 3.5 MHz was used in this event. Besides, as Comparative Example 1, an ultrasonic device was produced as in Example 1 except that a polydimethylsiloxane having a thickness of 1.2 mm was stuck to the vertical ultrasonic probe, and the peak value of the received waveform of the ultrasonic wave on the SUS substrate was measured. The results are listed in Table 1.

TABLE 1

|  | Thickness of Sample [mm] | Peak Value of Ultrasonic Wave When Applying No Voltage | Peak Value of Ultrasonic Wave When Applying Voltage of 500 V |
| --- | --- | --- | --- |
| Example 1-a | 0.2 | 0.0013 | 0.25 |
| Example 1-b | 0.5 | 0.0003 | 0.21 |
| Example 1-c | 0.8 | 0.0003 | 0.18 |
| Example 1-d | 1.2 | 0.0002 | 0.05 |
| Example 1-e | 1.5 | 0.0001 | 0.03 |
| Comparative Example 1 | 1.2 | 0.0005 | — |

Example 2

An electroadhesive element expressing body composed of a resin crosslinked body having electric rheology particles dispersed therein was prepared first. More specifically, 80 pts. wt. of laminar alumina particles having an average particle size of 10 μm, 9 pts. wt. of poly(9-vinylcarbazole), and 9 pts. wt. of copper phthalocyanine were dispersed in 20 pts. wt. of silicone oil. Then, 20 pts. wt. of silicone oligomer was dispersed in the dispersion liquid to form a uniform solution. Further, 2 pts. wt. of a crosslinking agent was added and dispersed therein. Subsequently, the prepared solution was applied onto a PET resin sheet having comb-shaped electrodes formed thereon and hardened as in Example 1. Finally, a part of the silicone oil contained therein was removed by a degreasing film, thereby producing an electroadhesive element expressing body. Observing the completed electroadhesive element expressing body under the electron microscope, a portion where the silicone oil existed was observed as a hole, and it was recognized that a part of the electroadhesive element expressing body became porous.

The produced electroadhesive element expressing body was loaded on the resonance-type AE sensor illustrated in FIG. 8 to produce a sonic device. The sonic device was put on the test object and the receiving sensitivity for an elastic wave was measured. In the sonic device in Example 2, the receiving sensitivity for an elastic wave was measured in a state of applying a voltage of 500 V to the electroadhesive element expressing body. Comparing with the case of using glycerin, as a couplant, in place of the electroadhesive element expressing body, it was confirmed that the sensitivity was substantially the same.

Example 3

An electroadhesive element expressing body composed of a resin crosslinked body having electric rheology particles dispersed therein was prepared first. 0.5 g of acrylic copolymer particles having divinylbenzen having an average particle size of 18 μm as a base material (manufactured by Sekisui Chemical Co., Ltd., trade name: Micropeal) were dispersed in a mixture of polyol, polyisocyanate, and catalyst, that is, 0.6 g of a base resin of a soft gell like a human skin (manufactured by Exseal Co. Ltd., trade name: Hitohada Gell). Then, a curing agent of the soft gell is mixed therein to form a solution. Subsequently, a flexible sheet made by a polyimide resin and a copper foil and formed comb-shaped electrodes having the positive electrode and the negative electrode thereon was prepared, and the above-described solution was applied onto the sheet to the thickness of 1 mm. The applied layer is semi-cured by applying a heat, and one layer of acrylic copolymer particles is put thereon, and is pressed thereon. Finally, the particles which do not adhere are blown off by an air shower, and a lamination of the sheet and the layer is heat cured, thereby producing an electroadhesive element expressing body.

A silicone rubber having Young's modulus of 27 MPa as a material of a polymer-containing layer is prepared, and is processed in a thickness from 5 mm to 30 mm. Those rubber sheets as the polymer-containing layers were adhered on the broadband-type vertical ultrasonic probe (ultrasonic transducer unit) using an adhesive individually, and each of the electroadhesive element expressing bodies was loaded thereon to produce five kinds of ultrasonic devices (Examples 3-a to 3-e). The ultrasonic devices were put on a SUS substrate having flaws therein and 20 μm of the concave-convex portions on the surface being a test object so that the electroadhesive element expressing bodies were in contact with the test object, and peak values of the received waveform of the ultrasonic wave when applying no voltage and when applying a voltage of 500 V were compared. Note that an ultrasonic wave having a frequency of 3.5 MHz was used in this event. Besides, as Reference Example 1, an ultrasonic device was produced as in Example 3 except that the polymer-containing layer is disposed, and the peak value of the received waveform of the ultrasonic wave on the SUS substrate was measured. The results are listed in Table 2.

TABLE 2

|  | Thickness of Polymer-containing Layer [mm] | Peak Value of Ultrasonic Wave When Applying No Voltage | Peak Value of Ultrasonic Wave When Applying Voltage of 500 V |
| --- | --- | --- | --- |
| Example 3-a | 5 | 0.0001 | 0.15 |
| Example 3-b | 10 | 0.0001 | 0.21 |
| Example 3-c | 15 | 0.0001 | 0.25 |
| Example 3-d | 20 | 0.0001 | 0.23 |
| Example 3-e | 30 | 0.0001 | 0.21 |
| Reference Example 1 | (None) | 0.0001 | — |

Example 4

An electroadhesive element expressing body composed of a resin crosslinked body having electric rheology particles dispersed therein was prepared first. 0.5 g of polystyrene particles having an average particle size of 20 μm (manufactured by Soken Chemical and Engineering Co., Ltd., trade name: SPG-70C) ware mixed with 2 g of PDMS (polydimethylsiloxane) resin (manufactured Dow Corrning Toray Co. Ltd., trade name: Sylgard 184 (base material: curing agent=10:1)), 3 g of silicone oil, and 0.2 g of titanyl phthalocyanine and stirred well to form a solution. A flexible sheet made by a polyimide resin and a copper foil and formed comb-shaped electrodes having the positive electrode and the negative electrode thereon was prepared, and the above-described solution was applied onto the sheet to the thickness of 2 mm, and is cured by applying a heat. Subsequently, a part of the silicone oil contained therein was removed by a degreasing film, thereby producing an electroadhesive element expressing body.

A polyrotaxane (manufactured Advanced Softmaterials Inc., a hardener by mixing a main component and a curing agent of SeRM, SAmixture (trade name: SH3403M2) in a prescribed rate and heated) is processed in a thickness from 5 mm to 30 mm, and peripheral regions of those sheets as the polymer-containing layers were processed so that a thickness of the central region is around 20% thicker than that of the peripheral region. Those polyrotaxane sheets as the polymer-containing layers were adhered on the broadband-type vertical ultrasonic probe using an adhesive individually, and each of the electroadhesive element expressing bodies was loaded thereon to produce five kinds of ultrasonic devices (Examples 4-a to 4-e). The ultrasonic devices were used for a portion spot-welded at a SUS substrate. The spot-welding portion has a hollow of 2 mm in diameter and a concave-convex portion of 20 μm provided therein. The ultrasonic devices were put on the SUS substrate so that the electroadhesive element expressing bodies were in contact with the SUS substrate, and peak values of the received waveform of the ultrasonic wave when applying no voltage and when applying a voltage of 500 V were compared. Note that an ultrasonic wave having a frequency of 15 MHz was used in this event. Besides, as Reference Example 2, an ultrasonic device was produced as in Example 4 except that the polymer-containing layer is disposed, and the peak value of the received waveform of the ultrasonic wave on the SUS substrate was measured. The results are listed in Table 3.

TABLE 4

| | Peripheral thickness of Polymer-containing Layer [mm] | Central thickness of Polymer-containing Layer [mm] | Peak Value of Ultrasonic Wave When Applying No Voltage | Peak Value of Ultrasonic Wave When Applying Voltage of 500 V |
|---|---|---|---|---|
| Example 4-a | 4 | 5 | 0.0001 | 0.12 |
| Example 4-b | 10 | 12 | 0.0001 | 0.20 |
| Example 4-c | 15 | 18 | 0.0001 | 0.26 |
| Example 4-d | 20 | 25 | 0.0001 | 0.24 |
| Example 4-e | 30 | 37 | 0.0001 | 0.28 |
| Reference Example 2 | (None) | (None) | 0.0001 | — |

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sonic device comprising:
a sonic transducer unit configured to perform at least one of transmitting and receiving a sonic wave, and having a sonic function surface to configure at least one of a wave transmitting surface and a wave receiving surface of the sonic wave; and
a sonic propagation unit comprising: a substrate having a pair of electrodes; an electroadhesive element expressing body, configured to come into contact with a test object, comprising a resin crosslinked body arranged on the substrate, and particles dispersed in the resin crosslinked body; and a power supply configured to apply voltage to the pair of electrodes, the sonic propagation unit being provided on the sonic function surface of the sonic transducer unit.

2. The device according to claim 1, wherein the particles are electric rheology particles.

3. The device according to claim 1, wherein the electroadhesive element expressing body further comprises a charge transport material contained in the resin crosslinked body.

4. The device according to claim 1, wherein the electroadhesive element expressing body further comprises conductive particles contained in the resin crosslinked body.

5. The device according to claim 1, wherein the electroadhesive element expressing body further comprises a process oil contained in the resin crosslinked body.

6. The device according to claim 1, wherein a ratio of acoustic impedances of the particles and the resin crosslinked body is in a range of 0.001 or more and 1000 or less.

7. The device according to claim 1, wherein the particles have an average particle size of 100 μm or less.

8. The device according to claim 1, wherein the electroadhesive element expressing body has a porous structure.

9. The device according to claim 3, wherein the electrodes contain a metal having a work function having a difference from a highest occupied molecular orbital of the charge transport material falling within 0.5 eV.

10. The device according to claim 4, wherein the electrodes contain a metal having a work function having a difference from a work function of the conductive particles falling within 0.5 eV.

11. The device according to claim 1, wherein the electroadhesive element expressing body has a function of accommodating the particles in the resin crosslinked body when the voltage is applied to the pair of electrodes from the power supply, and causing a part of the particles to project from a surface of the resin crosslinked body when the voltage is eliminated.

12. The device according to claim 1, wherein the sonic device is an ultrasonic transducer or a sonic receiver.

13. The device according to claim 1, wherein the sonic propagation unit further comprises a polymer-containing layer having a Young's modulus of 1 GPa or less, and disposed between the sonic function surface of the sonic transducer unit and the substrate.

14. The device according to claim 13, wherein the polymer-containing layer is fixed to the sonic function surface of the sonic transducer unit and a surface on opposite side of a surface of the substrate on which the electrodes are provided, each through an adhesive layer.

15. The device according to claim 13, wherein the polymer-containing layer contains a slide-ring elastomer.

16. The device according to claim 13, wherein the polymer-containing layer has a shape with a peripheral region and a central region having a thickness thicker than a thickness of the peripheral region.

17. The device according to claim 1, wherein the sonic propagation unit further comprises a layer containing a slide-ring elastomer and disposed between the sonic function surface of the sonic transducer unit and the substrate.

\* \* \* \* \*